United States Patent
Hammond (10) Patent No.: US 8,093,764 B2
(45) Date of Patent: *Jan. 10, 2012

(54) METHOD AND SYSTEM FOR BYPASSING A POWER CELL OF A POWER SUPPLY

(75) Inventor: Peter Willard Hammond, Greensburg, PA (US)

(73) Assignee: Siemens Industry, Inc., Alpharetta, GA (US)

(*) Notice: Subject to any disclaimer, the term of this patent is extended or adjusted under 35 U.S.C. 154(b) by 614 days.

This patent is subject to a terminal disclaimer.

(21) Appl. No.: 12/209,467

(22) Filed: Sep. 12, 2008

(65) Prior Publication Data

US 2009/0073622 A1 Mar. 19, 2009

Related U.S. Application Data

(60) Provisional application No. 60/971,965, filed on Sep. 13, 2007, provisional application No. 60/971,972, filed on Sep. 13, 2007.

(51) Int. Cl.
*H01H 9/54* (2006.01)
(52) U.S. Cl. ........................................................ 307/140
(58) Field of Classification Search .................. 307/17, 307/140, 412
See application file for complete search history.

(56) References Cited

U.S. PATENT DOCUMENTS

| | | | |
|---|---|---|---|
| 3,022,450 A | 2/1962 | Chase, Jr. | |
| 5,373,196 A * | 12/1994 | Faley | 307/46 |
| 5,387,859 A * | 2/1995 | Murugan et al. | 322/10 |
| 5,625,545 A | 4/1997 | Hammond | |
| 5,657,214 A * | 8/1997 | Nguyen et al. | 363/41 |
| 5,883,557 A | 3/1999 | Leung | |
| 5,986,909 A | 11/1999 | Hammond et al. | |
| 6,014,323 A | 1/2000 | Aiello et al. | |
| 6,166,513 A | 12/2000 | Hammond | |
| 6,222,284 B1 | 4/2001 | Hammond et al. | |
| 6,229,722 B1 | 5/2001 | Hirata | |
| 7,327,111 B2 | 2/2008 | Rastogi et al. | |
| 7,800,254 B2 * | 9/2010 | Hammond | 307/140 |
| 2003/0210117 A1 | 11/2003 | Arnholt | |
| 2007/0035261 A1 | 2/2007 | Amorino et al. | |

* cited by examiner

*Primary Examiner* — Albert W Paladini (57) ABSTRACT

A system for bypassing a power cell of a power supply, the system including a multi-winding device having a primary winding and a plurality of three-phase secondary windings, a plurality of power cells, wherein each power cell is connected to a different three-phase secondary winding of the multi-winding device, and a bypass device connected to first and second input terminals of at least one of the power cells and to first and second output terminals of the at least one of the power cells.

18 Claims, 12 Drawing Sheets

METHOD AND SYSTEM FOR BYPASSING A POWER CELL OF A POWER SUPPLY

RELATED APPLICATIONS AND CLAIM OF PRIORITY

This application claims the priority benefit of U.S. Provisional Application No. 60/971,965 filed Sep. 13, 2007, and U.S. Provisional Application No. 60/971,972 filed Sep. 13, 2007, each of which are hereby incorporated by reference.

Not Applicable

BACKGROUND

Figure 1:
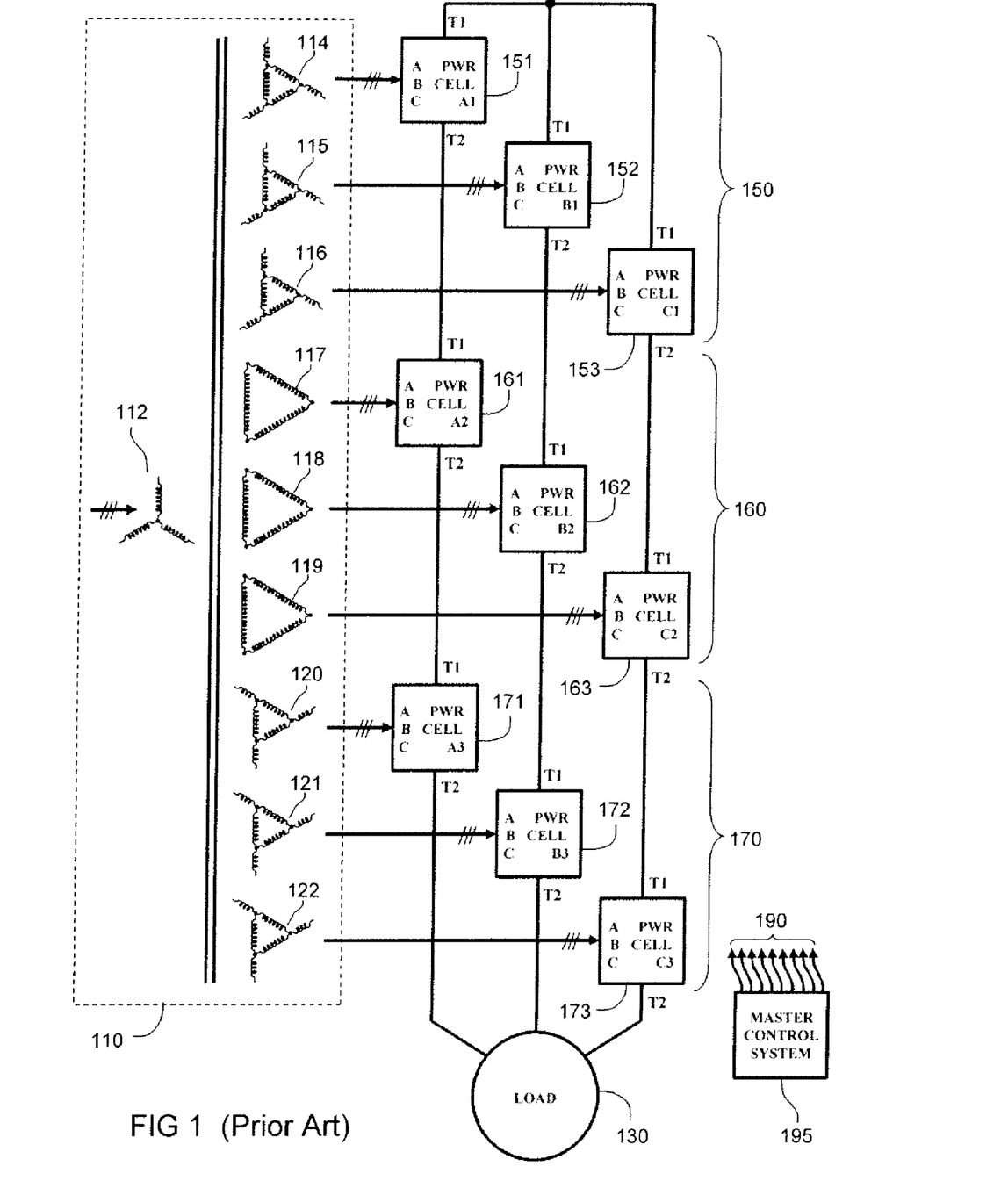
FIG. 1 illustrates various embodiments of a power supply.

This application discloses an invention that is related, generally and in various embodiments, to a method and system for bypassing a power cell in a multi-cell power supply. In certain applications, multi-cell power supplies utilize modular power cells to process power between a source and a load. Such modular power cells can be applied to a given power supply with various degrees of redundancy to improve the availability of the power supply. For example, FIG. 1 illustrates various embodiments of a power supply (e.g., an AC motor drive) having nine such power cells. The power cells in FIG. 1 are represented by a block having input terminals A, B, and C; and output terminals T1 and T2. In FIG. 1, a transformer or other multi-winding device 110 receives three-phase, medium-voltage power at its primary winding 112, and delivers power to a load 130 such as a three-phase AC motor via an array of single-phase inverters (also referred to as power cells). Each phase of the power supply output is fed by a group of series-connected power cells, called herein a "phase-group".

The transformer 110 includes primary windings 112 that excite a number of secondary windings 114-122. Although primary winding 112 is illustrated as having a star configuration, a mesh configuration is also possible. Further, although secondary windings 114-122 are illustrated as having a delta or an extended-delta configuration, other configurations of windings may be used as described in U.S. Pat. No. 5,625,545 to Hammond, the disclosure of which is incorporated herein by reference in its entirety. In the example of FIG. 1 there is a separate secondary winding for each power cell. However, the number of power cells and/or secondary windings illustrated in FIG. 1 is merely exemplary, and other numbers are possible. Additional details about such a power supply are disclosed in U.S. Pat. No. 5,625,545.

Any number of ranks of power cells are connected between the transformer 110 and the load 130. A "rank" in the context of FIG. 1 is considered to be a three-phase set, or a group of three power cells established across each of the three phases of the power delivery system. Referring to FIG. 1, rank 150 includes power cells 151-153, rank 160 includes power cells 161-163, and rank 170 includes power cells 171-173. A master control system 195 sends command signals to local controls in each cell over fiber optics or another wired or wireless communications medium 190. It should be noted that the number of cells per phase depicted in FIG. 1 is exemplary, and more than or less than three ranks may be possible in various embodiments.

Figure 2:
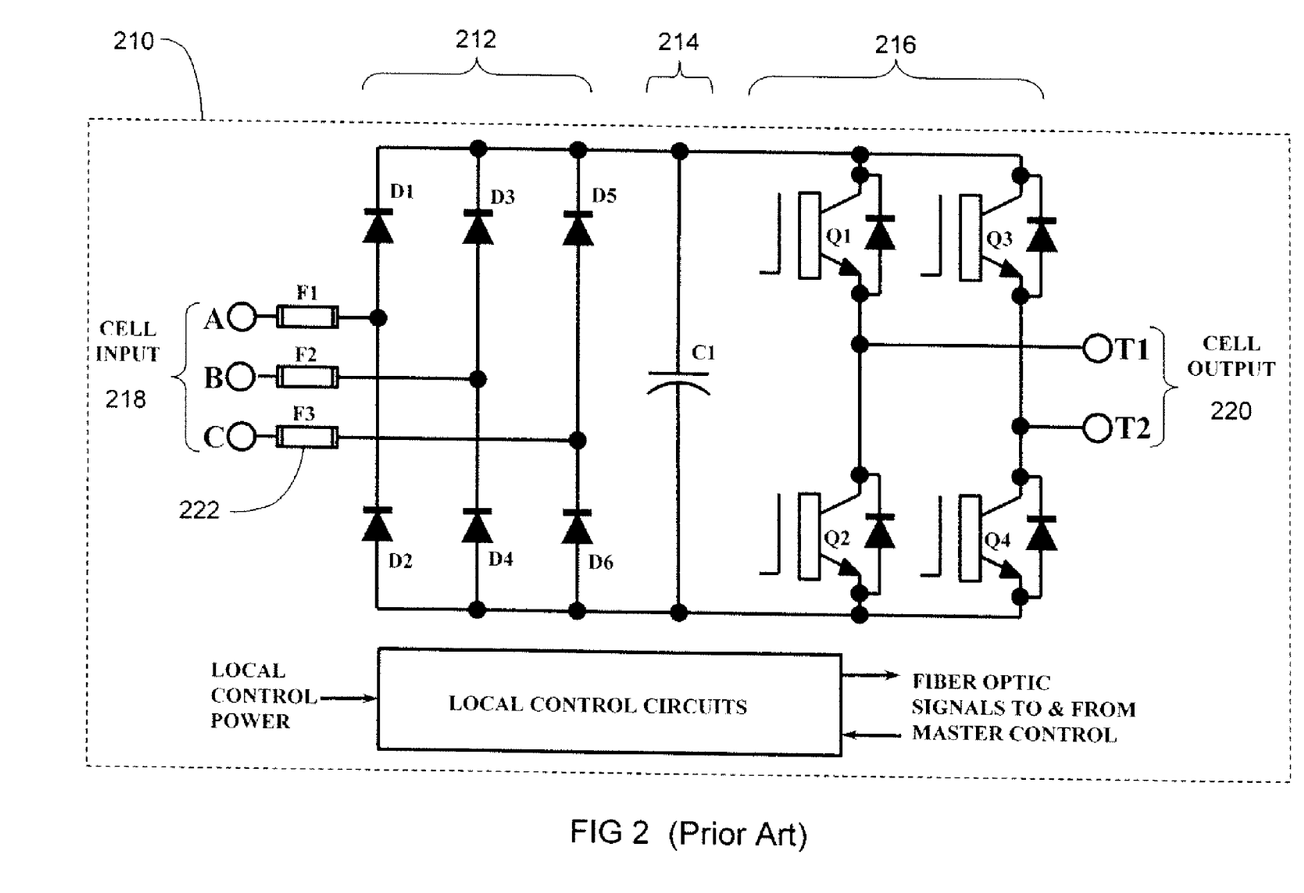
FIG. 2 illustrates various embodiments of a power cell of the power supply of FIG. 1.

FIG. 2 illustrates various embodiments of a power cell 210 which is representative of various embodiments of the power cells of FIG. 1. The power cell 210 includes a three-phase diode-bridge rectifier 212, one or more direct current (DC) capacitors 214, and an H-bridge inverter 216. The rectifier 212 converts the alternating current (AC) voltage received at cell input 218 (i.e., at input terminals A, B and C) to a substantially constant DC voltage that is supported by each capacitor 214 that is connected across the output of the rectifier 212. The output stage of the power cell 210 includes an H-bridge inverter 216 which includes two poles, a left pole and a right pole, each with two switching devices. The inverter 216 transforms the DC voltage across the DC capacitors 214 to an AC output at the cell output 220 (i.e., across output terminals T1 and T2) using pulse-width modulation (PWM) of the semiconductor devices in the H-bridge inverter 216.

As shown in FIG. 2, the power cell 210 may also include fuses 222 connected between the cell input 218 and the rectifier 212. The fuses 222 may operate to help protect the power cell 210 in the event of a short-circuit failure. According to other embodiments, the power cell 210 is identical to or similar to those described in U.S. Pat. No. 5,986,909 (the "'909 Patent") and its derivative U.S. Pat. No. 6,222,284 (the "'284 Patent) to Hammond and Aiello, the disclosures of which are incorporated herein by reference in their entirety.

Figure 3:
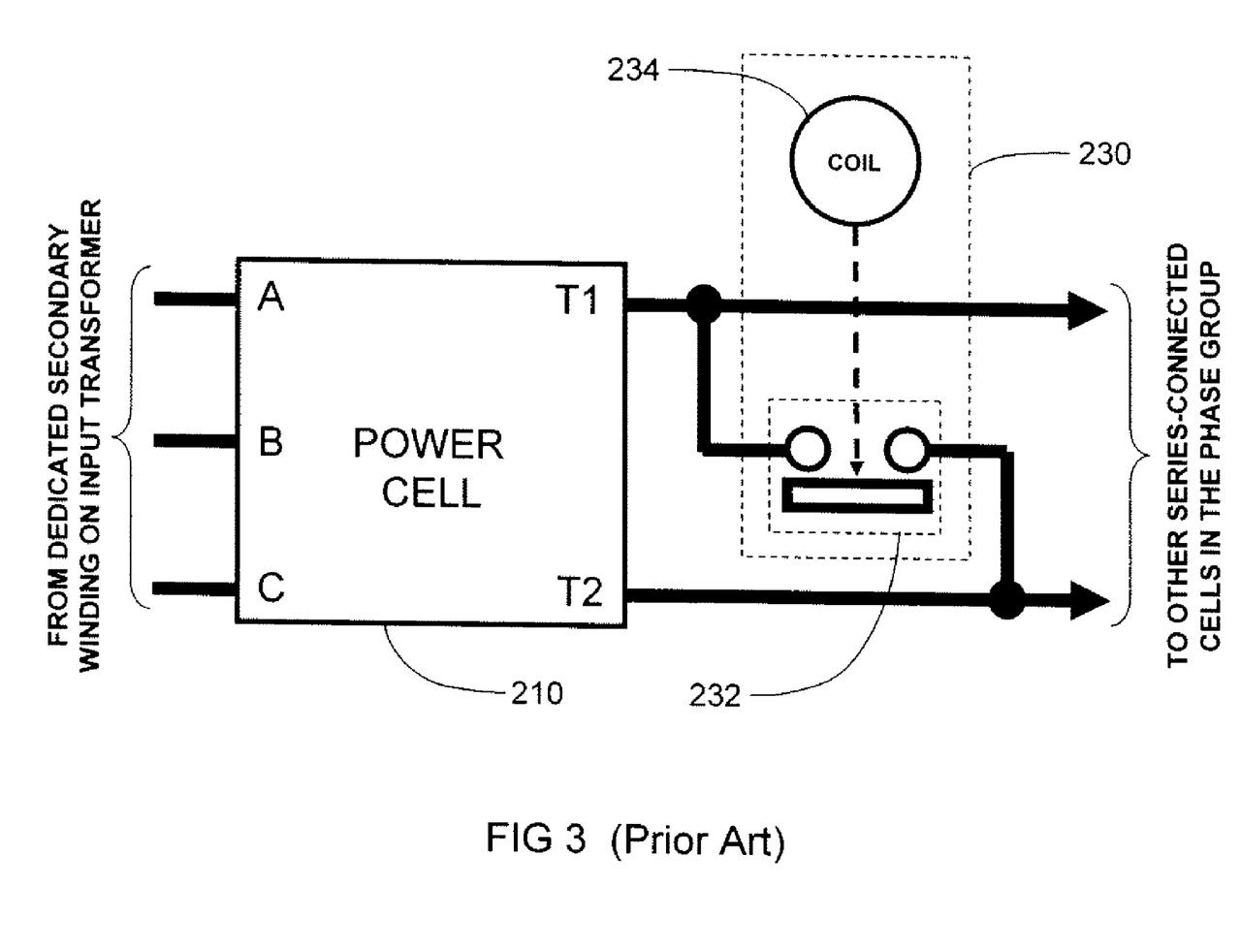
FIG. 3 illustrates various embodiments of a bypass device connected to an output of the power cell of FIG. 2.

FIG. 3 illustrates various embodiments of a bypass device 230 connected to output terminals T1 and T2 of the power cell 210 of FIG. 2. In general, when a given power cell of a multi-cell power supply fails in an open-circuit mode, the current through all the power cells in that phase-group will go to zero, and further operation is not possible. A power cell failure may be detected by comparing a cell output voltage to the commanded output, by checking or verifying cell components, through the use of diagnostics routines, etc. In the event that a given power cell should fail, it is possible to bypass the failed power cell and continue to operate the multi-cell power supply at reduced capacity.

The bypass device 230 is a single pole single throw (SPST) contactor, and includes a contact 232 and a coil 234. As used herein, the term "contact" generally refers to a set of contacts having stationary portions and a movable portion. Accordingly, the contact 232 includes stationary portions and a movable portion which is controlled by the coil 234. The bypass device 230 may be installed as an integral part of a converter subassembly in a drive unit. In other applications the bypass device 230 may be separately mounted. When the movable portion of the contact 232 is in a bypass position, a shunt path is created between the respective output lines connected to output terminals T1 and T2 of the power cell 210. Stated differently, when the movable portion of the contact 232 is in a bypass position, the output of the failed power cell is shorted. Thus, when power cell 210 experiences a failure, current from other power cells in the phase group can be carried through the bypass device 230 connected to the failed power cell 210 instead of through the failed power cell 210 itself.

Figure 4:
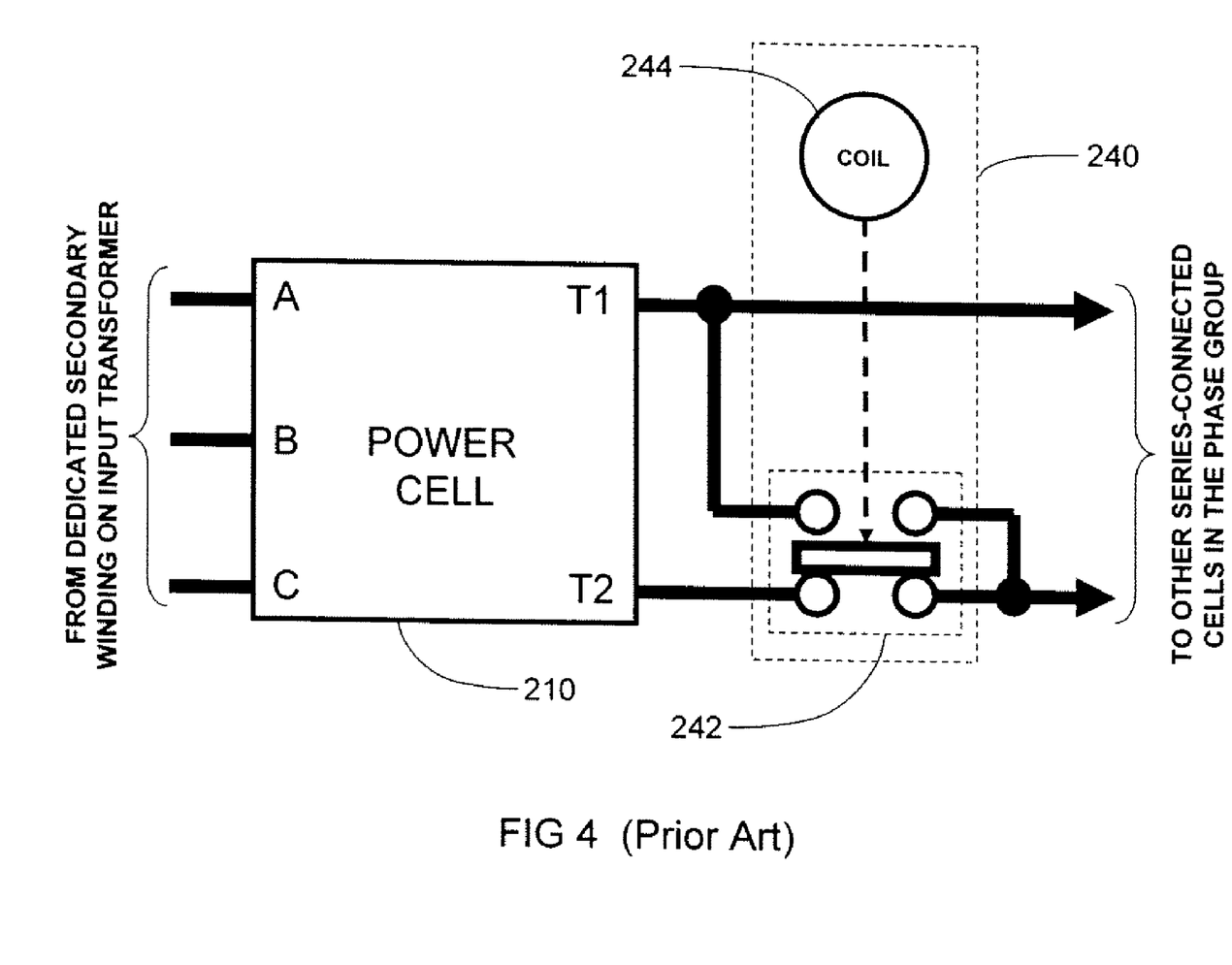
FIG. 4 illustrates various embodiments of a bypass device connected to an output of the power cell of FIG. 2.

FIG. 4 illustrates various embodiments of a different bypass device 240 connected to output terminals T1 and T2 of the power cell 210. The bypass device 240 is a single pole double throw (SPDT) contactor, and includes a contact 242 and a coil 244. The contact 242 includes stationary portions and a movable portion which is controlled by the coil 244. When the movable portion of the contact 242 is in a bypass position, one of the output lines of the power cell 210 is disconnected (e.g., the output line connected to output terminal T2 in FIG. 4) and a shunt path is created between the output line connected to output terminal T1 of the power cell 210 and a downstream portion of the output line connected to output terminal T2 of the power cell 210. The shunt path carries current from other power cells in the phase group which would otherwise pass through the power cell 210. Thus, when power cell 210 experiences a failure, the output of the failed power cell is not shorted as is the case with the bypass configuration of FIG. 3.

The bypass devices shown in FIGS. 3 and 4 do not operate to disconnect power to any of the input terminals A, B or C in the event of a power cell failure. Thus, in certain situations, if the failure of a given power cell is not severe enough to cause the fuses 222 (see FIG. 2) to disconnect power to any two of input terminals A, B or C, the failure can continue to cause damage to the given power cell.

SUMMARY

In one general respect, this application discloses a system including a multi-winding device having a primary winding and a plurality of three-phase secondary windings, a plurality of power cells, wherein each power cell is connected to a different three-phase secondary winding of the multi-winding device, and a bypass device connected to first and second input terminals of at least one of the power cells and to first and second output terminals of at least one of the power cells.

In another general respect, this application discloses a method including determining that a failure has occurred in a power cell of a multi-cell power supply and applying a pulse of current from a control circuit to a coil. The coil is connected to a first contact which is connected to a first input terminal of the power cell, a second contact which is connected to a second input terminal of the power cell, and a third contact which is connected to first and second output terminals of the power cell.

DESCRIPTION OF THE DRAWINGS

Various embodiments of the invention are described herein by way of example in conjunction with the following figures.

DETAILED DESCRIPTION

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Figure 5:
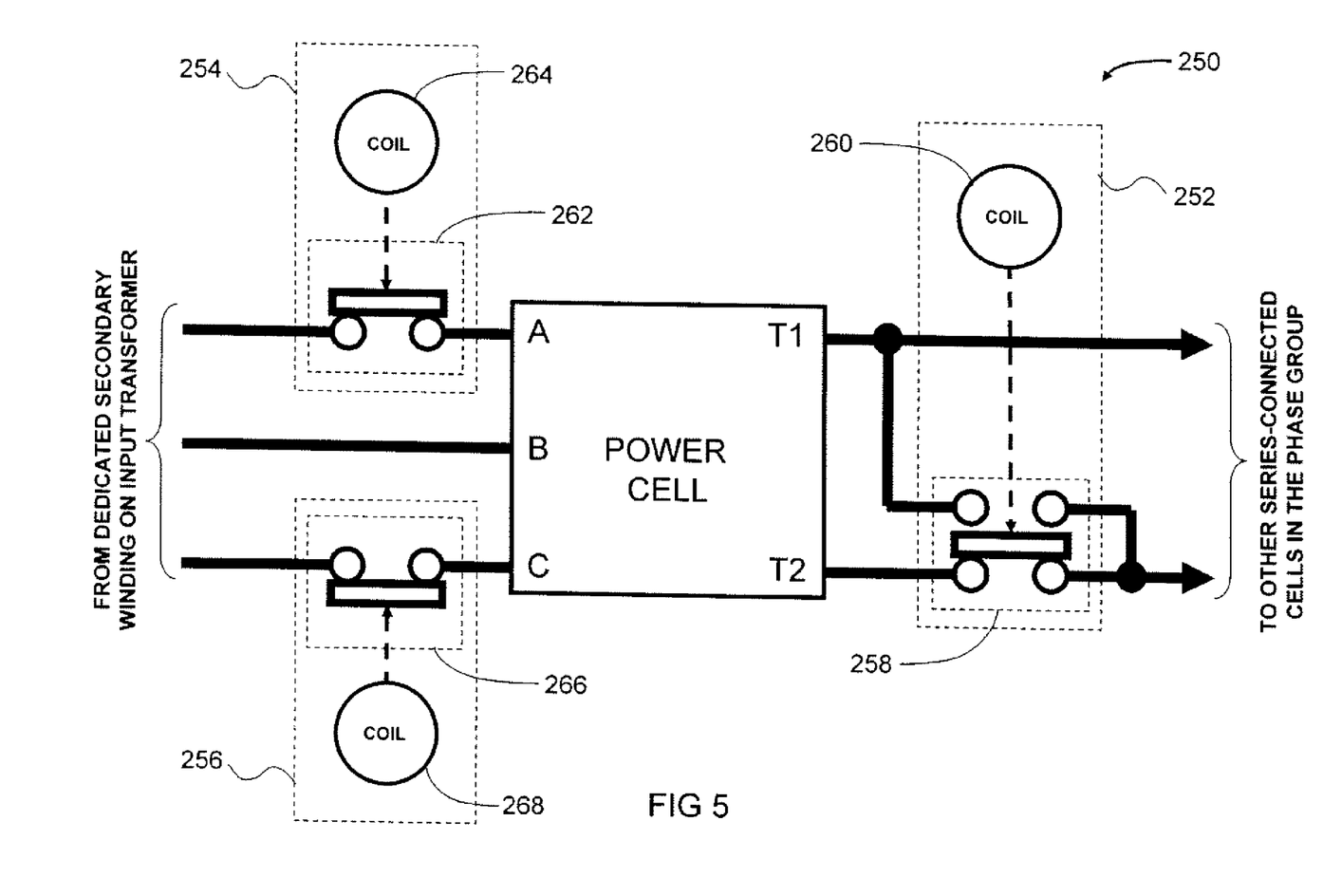
FIG. 5 illustrates various embodiments of a system for bypassing a power cell of a power supply.

FIG. 5 illustrates various embodiments of a system 250 for bypassing a power cell (e.g., power cell 210) of a power supply. As shown in FIG. 5, the system 250 includes bypass device 252 connected to the output terminals T1 and T2, a bypass device 254 connected to input terminal A, and a bypass device 256 connected to input terminal C. Although the system 250 is shown in FIG. 5 as having respective bypass devices connected to input terminals A and C, it will be appreciated that, according to other embodiments, the respective bypass devices may be connected to any two of the input terminals A, B and C.

The bypass devices 252, 254, 256 may be mechanically-driven, fluid-driven, electrically-driven, or solid state, as is described in the '909 and '284 Patents. For purposes of simplicity, each bypass device will be described hereinafter in the context of a bypass device which includes one or more electrically-driven contactors which are connected to the output of a power cell. As described hereinafter, a given bypass device may be embodied as a single pole single throw (SPST) contactor, a single pole double throw (SPDT) contactor, or a multi-pole contactor.

Bypass device 252 is a single pole double throw (SPDT) contactor, and includes a contact 258 and a coil 260. The contact 258 includes stationary portions and a movable portion which is controlled by the coil 260. The bypass device 252 operates in a manner similar to that described hereinabove with respect to bypass device 240 of FIG. 4. The bypass device 254 is a single pole single throw (SPST) contactor, and includes a contact 262 and a coil 264. The contact 262 includes stationary portions and a movable portion which is controlled by the coil 264. The bypass device 256 is a single pole single throw (SPST) contactor, and includes a contact 266 and a coil 268. The contact 266 includes stationary portions and a movable portion which is controlled by the coil 268. In general, in the event of a failure, bypass devices 254, 256 disconnect the cell input power at substantially the same time that bypass device 252 creates a shunt path for the current that formerly passed through the failed power cell.

The condition associated with the creation of the described shunt path and the disconnection of cell input power from at least two of the cell input terminals may be referred to as "full-bypass". When the full bypass condition is present, no further power can flow into the failed cell. As described with respect to FIG. 2, the fuses 222 of the power cell may operate to help protect the power cell in the event of a short-circuit failure. However, in certain situations (e.g., when fault current is low), the fuses 222 may not clear quickly enough to prevent further damage to the failed power cell. According to various embodiments, the bypass devices 254, 256 are configured to act quicker than the fuses 222, and the quicker action generally results in less damage to the failed power cell.

Figure 6:
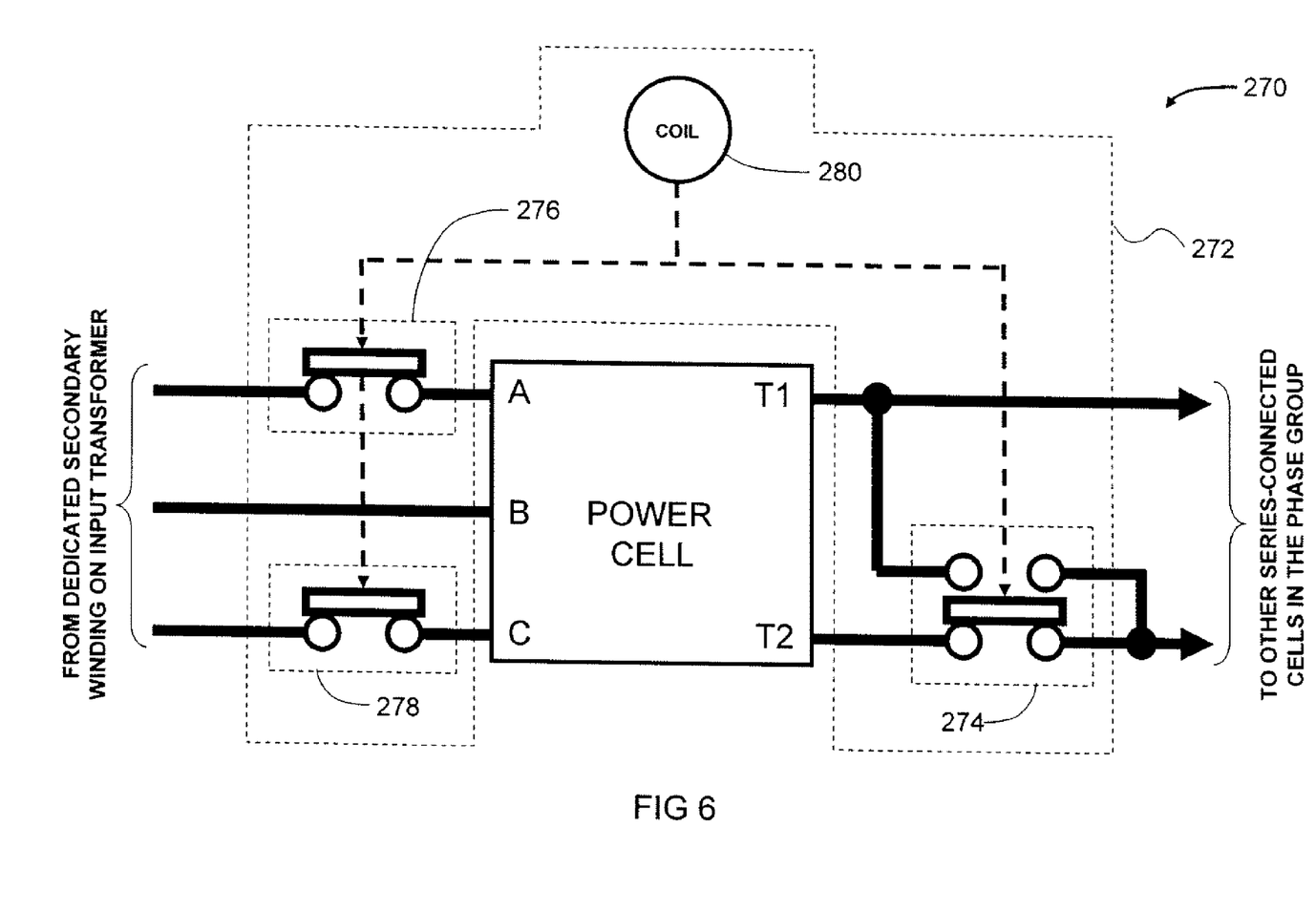
FIG. 6 illustrates various embodiments of a system for bypassing a power cell of a power supply.

FIG. 6 illustrates various embodiments of a system 270 for bypassing a power cell (e.g., power cell 210) of a power supply. The system 270 includes a single bypass device 272 which achieves the combined functionality of the bypass devices 252, 254, 256 of FIG. 5. The bypass device 272 is a multi-pole contactor which includes a first contact 274 connected to the output terminals T1 and T2 of the power cell, a second contact 276 connected to the input terminal A, and a third contact 278 connected to the input terminal C. Each of the contacts 274, 276, 278 include stationary portions and a movable portion. Although the second and third contacts 276, 278 are shown in FIG. 6 as being connected to input terminals A and C, it will be appreciated that, according to other embodiments, the second and third contacts 276, 278 may be connected to any two of the input terminals A, B and C. The bypass device 272 also includes a single coil 280 which controls the movable portions of the contacts 274, 276, 278.

The previously discussed methods may be applied with conventional contactors or solenoids, specifically contactors that hold their contacts in a first position when the coil is not energized and hold their contacts in a second position when the coil is energized. However, it may be preferable to employ magnetic latching contactors or solenoids. Magnetically latching contactors or solenoids include permanent magnets which hold their contacts in either the first or second position when the coil is not energized, and upon the application of a brief pulse of voltage to the coil, the contacts transfer to the other position (i.e., first position to second position or second position to first position). A magnetic latching contactor may employ only one coil. In this contactor, the direction of transfer of the contacts may be determined by the polarity of the voltage pulse applied to the coil. Similarly, a magnetic latching contactor may employ two coils, such as the contactor described in U.S. Pat. No. 3,022,450 to Chase. In this type of contactor, the direction of transfer of the contacts may be determined by which of the two coils is energized. In the following exemplary description, a single-coil contactor embodiment is presented by way of example only. A two-coil contactor is equally valid and may be substituted for any of the single-coil contactors. In light of this, all references to the coils will include a possible two-coil reference as well, i.e., "coil(s)".

Figure 7:
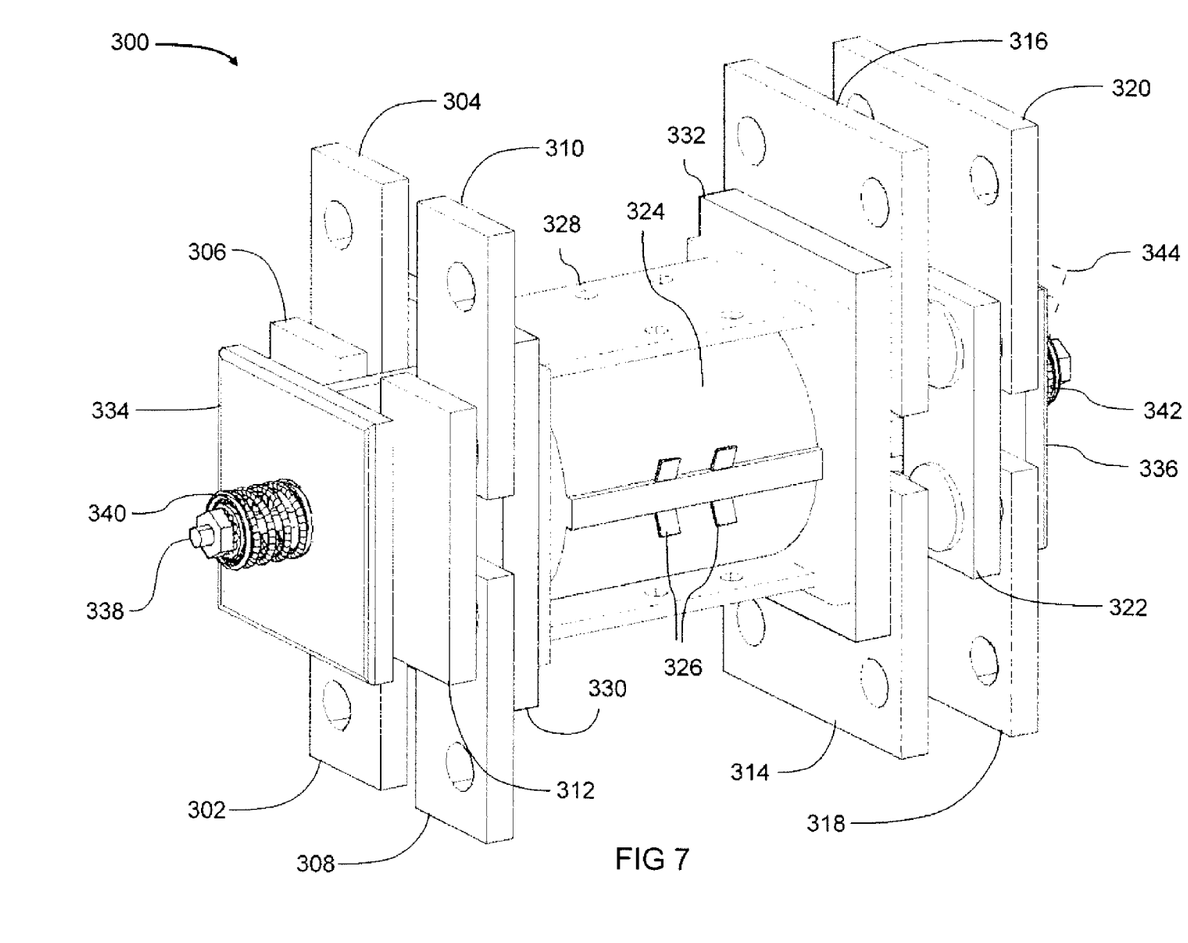
FIGS. 7-9 illustrate various embodiments of a bypass device.
Figure 8:
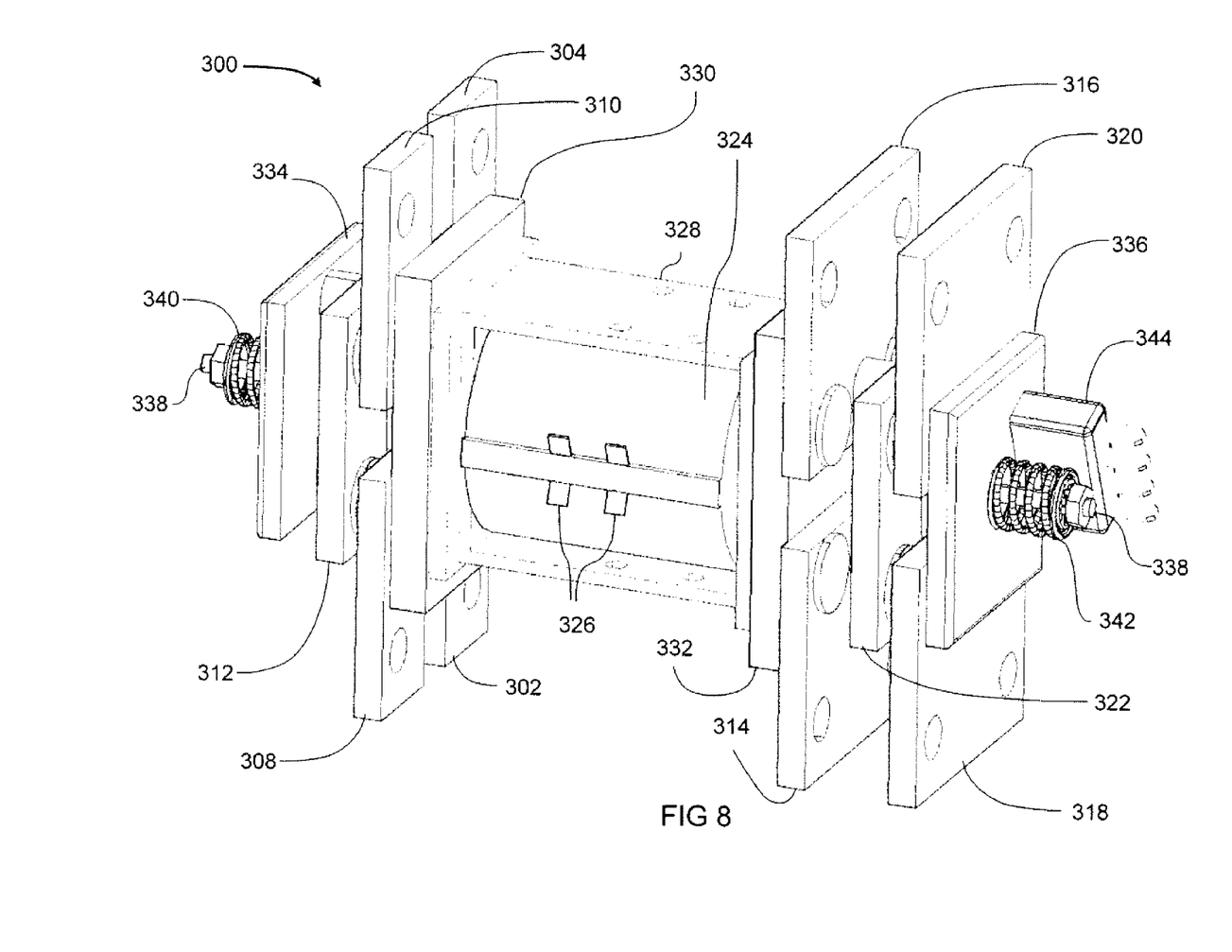
Figure 9:
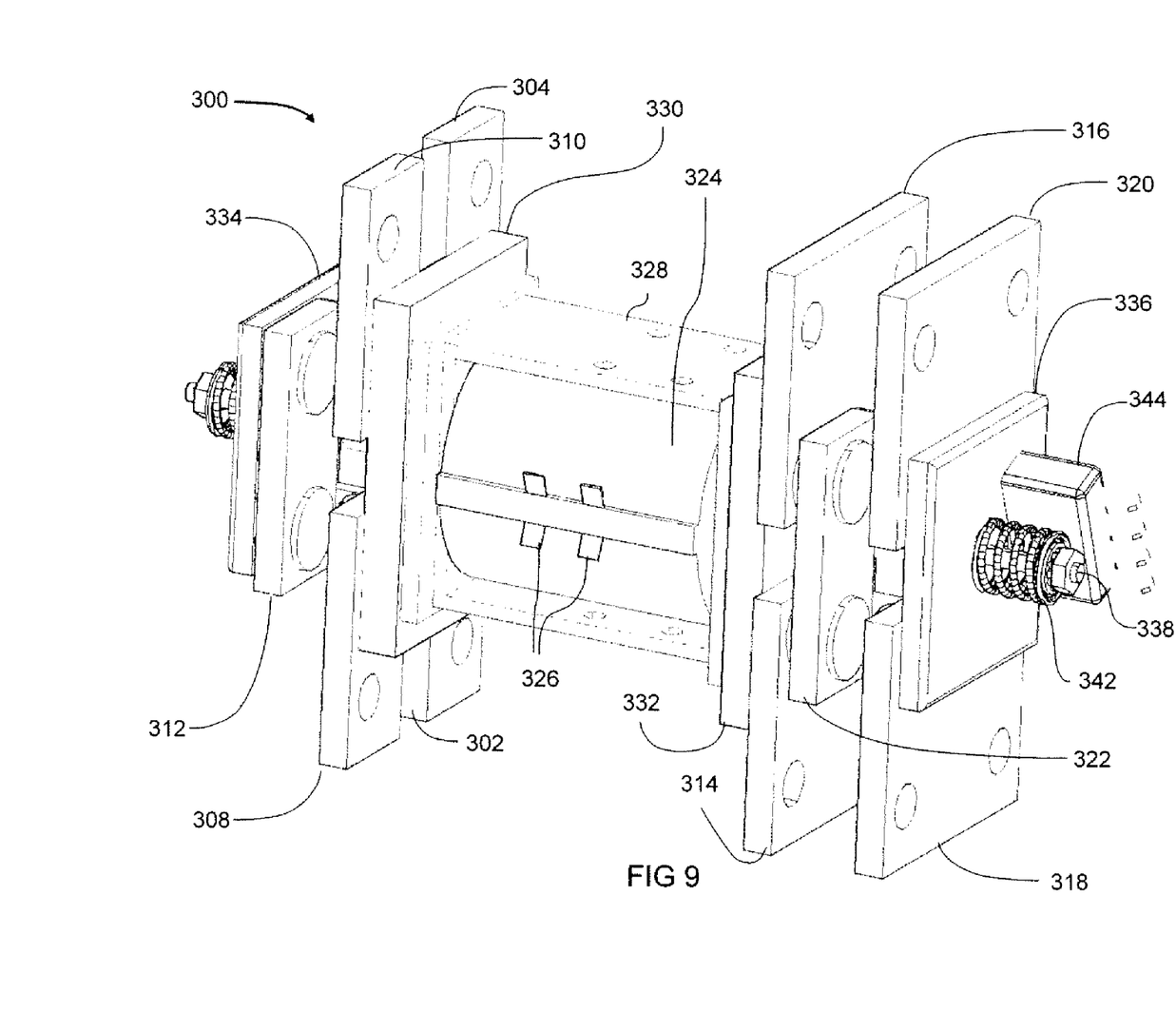

FIGS. 7-9 illustrate various embodiments of a bypass device 300. The bypass device is a multi-pole contactor, and may be identical to or similar to the bypass device 272 of FIG. 6. The bypass device 300 includes a first contact which includes stationary portions 302, 304 and movable portion 306, a second contact which includes stationary portions 308, 310 and a movable portion 312, and a third contact which includes stationary portions 314, 316, 318, 320 and a movable portion 322. The bypass device 300 also includes a solenoid, or coil(s) 324 which controls the movable portions 306, 312, 322 of the first, second and third contacts. The stationary portions 304, 310 of the first and second contacts may be connected to any two of the input terminals A, B and C of a power cell. The stationary portions 314, 318 of the third contact may be respectively connected to the output terminals T1 and T2 of a power cell. The movable portions 306, 312, 322 of the first, second and third contacts are shown in the normal or non-bypass position in FIGS. 7 and 8, and are shown in the bypass position in FIG. 9.

As shown in FIG. 7, the bypass device 300 also includes electrical terminals 326 connected to the coil(s) 324, a steel frame 328 which surrounds the coil(s) 324, a first insulating plate 330 between the steel frame 328 and the stationary portions 304, 308, 310, 312 of the first and second contacts, a second insulating plate 332 between the steel frame 328 and the stationary portions 314, 316 of the third contact, and first and second support brackets 334, 336. The bypass device 300 further includes a non-magnetic shaft 338 which passes through the coil(s) 324, through openings in the steel frame 328, through respective openings in first and second insulating plates 330, 332, and through respective openings of the first and second support brackets 334, 336.

Additionally, the bypass device 300 also includes a first biasing member 340 between the first support bracket 334 and a first end of the non-magnetic shaft 338, a second biasing member 342 between the second support bracket 336 and a second end of the non-magnetic shaft, and a position sensing device 344 which is configured to provide an indication of the position (bypass or non-bypass) of the movable portions 306, 312, 322 of the first, second and third contacts.

Although not shown for purposes of simplicity in FIGS. 7-9, one skilled in the art will appreciate that the bypass device 300 may further include a plunger (e.g., a cylindrical steel plunger) which can travel axially through an opening which extends approximately from the first end of the coil(s) 324 to the second end of the coil(s) 324, permanent magnets capable of holding the movable portions of the contacts in either the bypass or the non-bypass position without current being applied to the coil(s) 324, a first insulating bracket which carries the moving portions 306, 312 of the first and second contacts, a second insulating bracket which carries the moving portion 322 of the third contact, etc.

In operation, permanent magnets (not shown) hold the plunger in either a first or a second position, which in turn holds the movable portions 306, 312, 322 of the contacts in either the non-bypass position or the bypass position. When the electrical terminals 326 receive pulses of current, the pulses of current are applied to the coil(s) 324, thereby generating a magnetic field. Depending on the polarity of the applied pulse and the position of the plunger, the applied pulse may or may not cause the plunger to change its position. For example, according to various embodiments, if the plunger is in the first position and the movable portions 306, 312, 322 of the contacts are in the non-bypass position, a positive current pulse will change the plunger from the first position to the second position, which in turn changes the movable portions 306, 312, 322 of the contacts from the non-bypass position to the bypass position. In contrast, if a negative current pulse is applied, the plunger will stay in the first position and the movable portions 306, 312, 322 of the contacts will stay in the non-bypass position.

Similarly, according to various embodiments, if the plunger is in the second position and the movable portions 306, 312, 322 of the contacts are in the bypass position, a negative current pulse will change the plunger from the second position to the first position, which in turn changes the movable portions 306, 312, 322 of the contacts from the bypass position to the non-bypass position. In contrast, if a positive current pulse is applied, the plunger will stay in the second position and the movable portions 306, 312, 322 of the contacts will stay in the bypass position.

Figure 10:
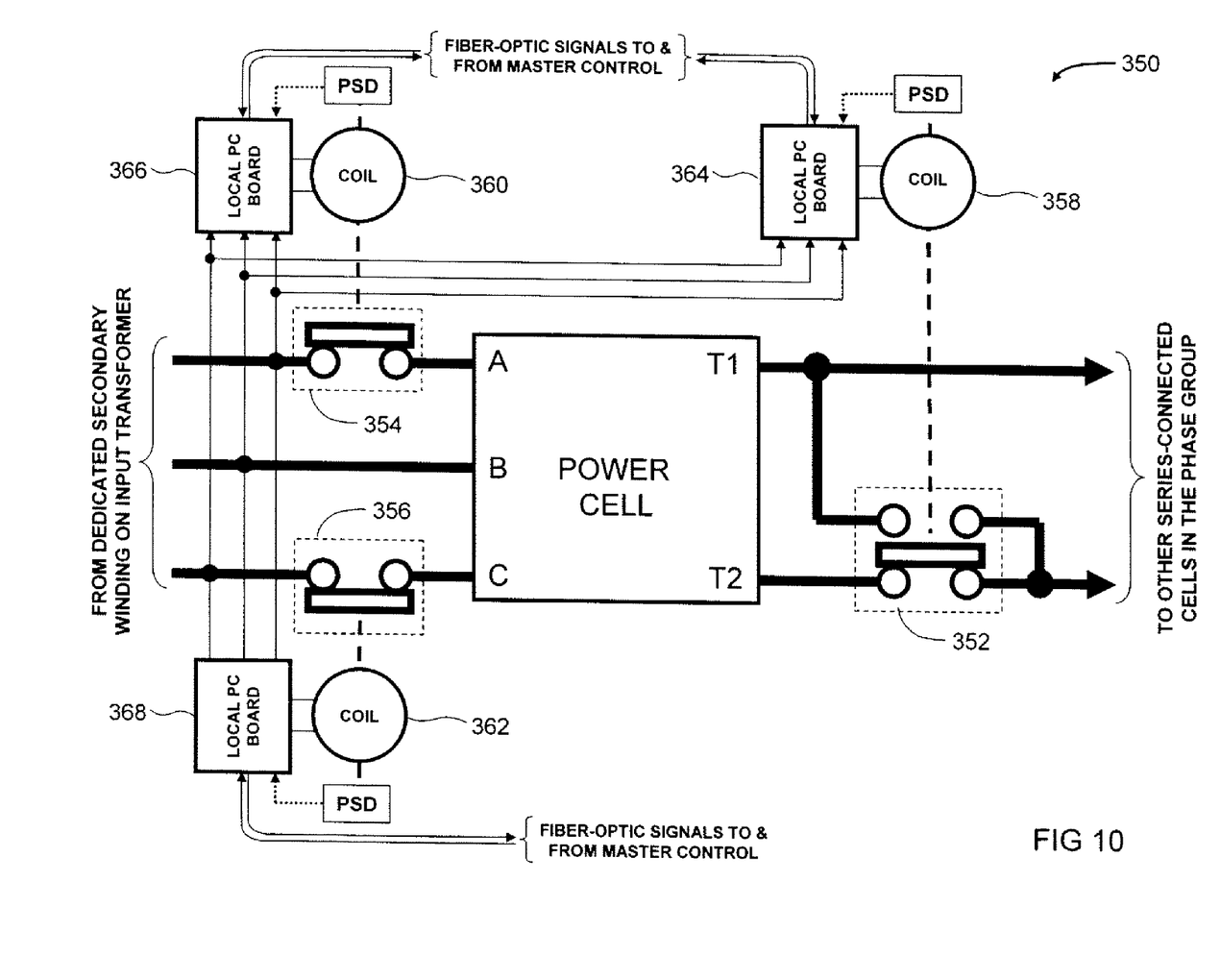
FIG. 10 illustrates various embodiments of a system for bypassing a power cell of a power supply.

FIG. 10 illustrates various embodiments of a system 350 for bypassing a power cell (e.g., power cell 210) of a power supply. The system 350 is similar to the system 250 of FIG. 5. The system 350 includes a first contact 352 connected to the output terminals T1 and T2 of the power cell, a second contact 354 connected to the input terminal A of the power cell, and a third contact 356 connected to the input terminal C of the power supply. Each of the contacts 352, 354, 356 include stationary portions and a movable portion. Although the second and third contacts 354, 356 are shown in FIG. 10 as being connected to input terminals A and C, it will be appreciated that, according to other embodiments, the second and third contacts 354, 356 may be connected to any two of the input terminals A, B and C.

The system 350 also includes a first coil(s) 358 which controls the movable portions of the first contact 352, a second coil(s) 360 which controls the movable portion of the second contact 354, and a third coil(s) 362 which controls the movable portion of the third contact 356. According to various embodiments, the coils 358, 360, 362 are embodied as contactor coils. According to other embodiments, the coils 358, 360, 362 are embodied as part of magnetic latching contactors which do not need to have continuous power applied to the coils in order to hold the plunger in its first or second position and/or to hold the moving portions of the contacts 352, 354, 356 in the non-bypass or bypass position.

As previously discussed, the magnetic latching contactors may employ a single-coil or a two-coil configuration. The first contact 352 and the first coil(s) 358 may collectively comprise a first contactor, the second contact 354 and the second coil(s) 360 may collectively comprise a second contactor, and the third contact 356 and the third coil(s) 362 may collectively comprise a third contactor.

The system 350 further includes a first local printed circuit board 364 in communication with the first coil(s) 358, a second local printed circuit board 366 in communication with the second coil(s) 360, and a third local printed circuit board 368 in communication with the third coil(s) 362. Each of local printed circuit boards 364, 366, 368 are configured to control the respective movable portions of the contacts 352, 354, 356 via the respective coils 358, 360, 362. In general, each of the local printed circuit boards 364, 366, 368 is configured to receive commands from, and report status to, a master control device (e.g., master control system 195 of FIG. 1) that is held near ground potential. Each of the local printed circuit boards 364, 366, 368 are also configured to deliver pulses of energy to the respective coils 358, 360, 362 as needed to change the position of the movable portions of the respective contacts 352, 354, 356, and to recognize the position of the movable portions of the respective contacts 352, 354, 356. For example, if the master control device detects that a power cell is to be bypassed, the master control device may send a signal to an individual printed circuit board (e.g., printed circuit board 364). Upon receiving the signal, the printed circuit board may control the movable portion of its respective contact, thereby bypassing the power cell. Each of the local printed circuit boards 364, 366, 368 may obtain control power from the input lines which are connected to input terminals A, B, C of the power cell, or from a remote power source. As shown in FIG. 10, one or more position sensing devices (PSD) 365, 367, 369 may be utilized to provide the local printed circuit boards 364, 366, 368 with the respective positions of the movable portions of the contacts 352, 354, 356. According to various embodiments, the position sensing devices may be embodied as switching devices, Hall Effect sensors, optical sensors, etc.

For embodiments where the coils 358, 360, 362 are part of magnetic latching contactors, the local printed circuit boards 364, 366, 368 may each include a DC capacitor which can store enough energy to switch the plunger and/or the movable portions of the respective contacts 352, 354, 356 between positions. Each of the local printed circuit boards 364, 366, 368 may also include a power supply which restores the stored energy after a switching event, using AC power from the input lines connected to the input terminals A, B, C of the power cell, or from a remote power source.

Figure 11:
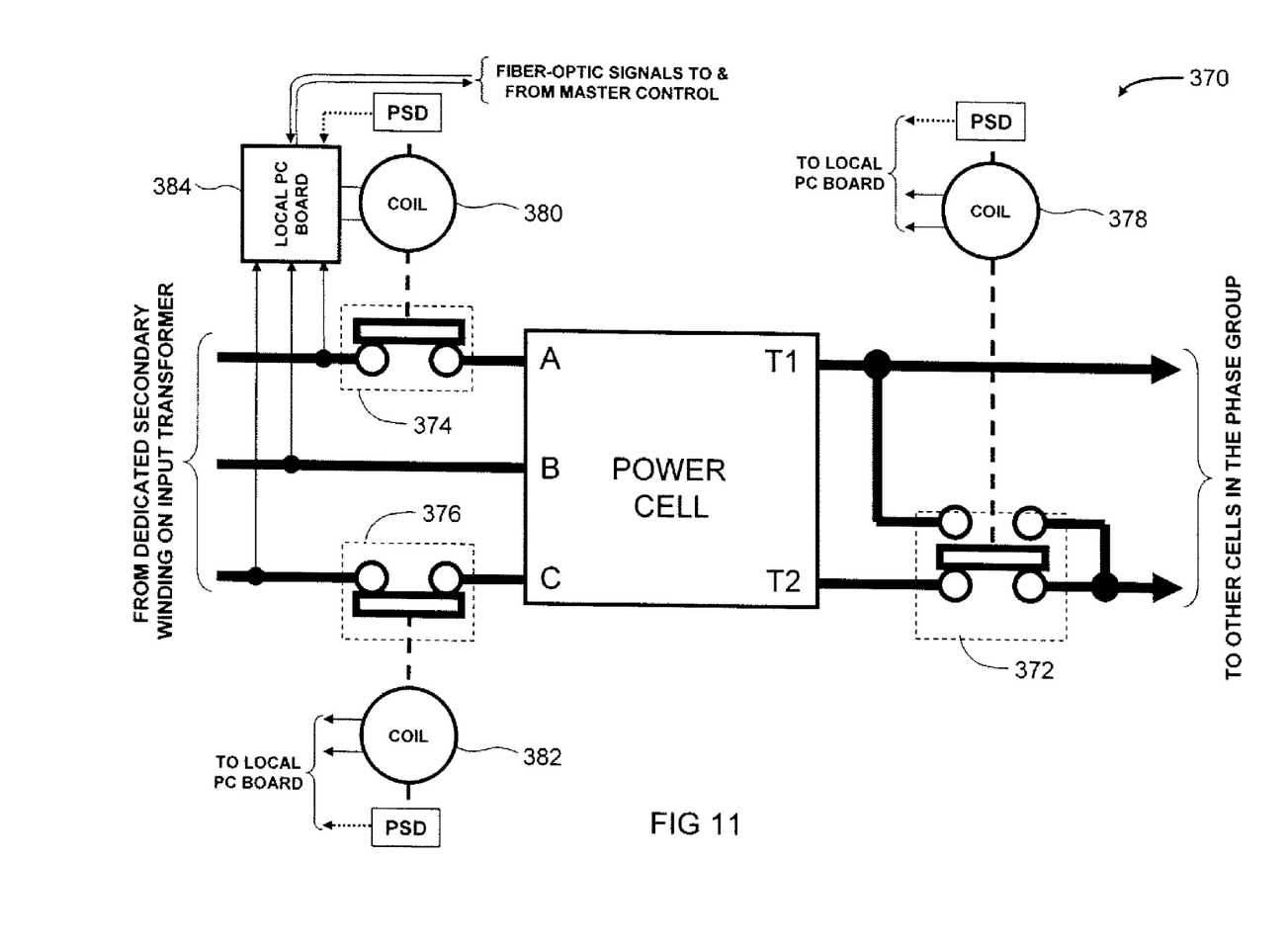
FIG. 11 illustrates various embodiments of a system for bypassing a power cell of a power supply.

FIG. 11 illustrates various embodiments of a system 370 for bypassing a power cell (e.g., power cell 210) of a power supply. The system 370 is similar to the system 350 of FIG. 10. The system 370 includes a first contact 372 connected to the output terminals T1 and T2 of the power cell, a second contact 374 connected to the input terminal A of the power cell, and a third contact 376 connected to the input terminal C of the power supply. Each of the contacts 372, 374, 376 include stationary portions and a movable portion. Although the second and third contacts 374, 376 are shown in FIG. 11 as being connected to input terminals A and C, it will be appreciated that, according to other embodiments, the second and third contacts 374, 376 may be connected to any two of the input terminals A, B and C.

The system 370 also includes a first coil(s) 378 which controls the movable portions of the first contact 372, a second coil(s) 380 which controls the movable portion of the second contact 374, and a third coil(s) 382 which controls the movable portion of the third contact 376. According to various embodiments, the coils 378, 380, 372 are embodied as contactor coils. According to other embodiments, the coils 378, 380, 382 are embodied as part of magnetic latching contactors which do not need to have continuous power applied to the coils in order to hold the plunger in its first or second position and/or to hold the moving portions of the contacts 372, 374, 376 in the non-bypass or bypass position. As previously discussed, the magnetic latching contactors may employ a single-coil or a two-coil configuration.

According to various embodiments, the first contact 372 and the first coil(s) 378 are portions of a first bypass device, the second contact 374 and the second coil(s) 380 are portions of a second bypass device, and the third contact 376 and the third coil(s) 382 are portions of a third bypass device. For such embodiments, the system 370 includes a plurality of bypass devices.

In contrast to the system 350 of FIG. 10, the system 370 includes a single local printed circuit board 384 which is in communication with the first coil(s) 378, the second coil(s) 380, and the third coil(s) 382. The local printed circuit board 384 is configured to control the respective movable portions of the contacts 372, 374, 376 via the respective coils 378, 380, 382. Thus, the local printed circuit board 384 is similar to the local printed circuit boards described with respect to FIG. 10, but is different in that the local printed circuit board 384 is configured to drive three coils and recognize the respective positions of the movable portions of three contacts. In general, the local printed circuit board 384 is configured to receive commands from, and report status to, a master control device (e.g., master control system 195 of FIG. 1) that is held near ground potential.

The local printed circuit board 384 is also configured to deliver pulses of energy to the coils 378, 380, 382 as needed to change the position of the movable portions of the respective contacts 372, 374, 376, and to detect the position of the movable portions of the respective contacts 372, 374, 376. The local printed circuit board 384 may obtain control power from the input lines which are connected to input terminals A, B, C of the power cell, or from a remote power source. As shown in FIG. 11, one or more position sensing devices 379, 383, 385 may be utilized to provide the local printed circuit board 384 with the respective positions of the movable portions of the contacts 372, 374, 376. According to various embodiments, the position sensing devices may be embodied as switching devices, Hall Effect sensors, optical sensors, etc.

For embodiments where the coils 378, 380, 382 are part of magnetic latching contactors, the local printed circuit board 384 may include a DC capacitor which can store enough energy to switch the plunger and/or the movable portions of the contacts 352, 354, 356 between positions. The local printed circuit board 384 may also include a power supply which restores the stored energy after a switching event, using AC power from the input lines connected to the input terminals A, B, C of the power cell, or from a remote power source.

Figure 12:
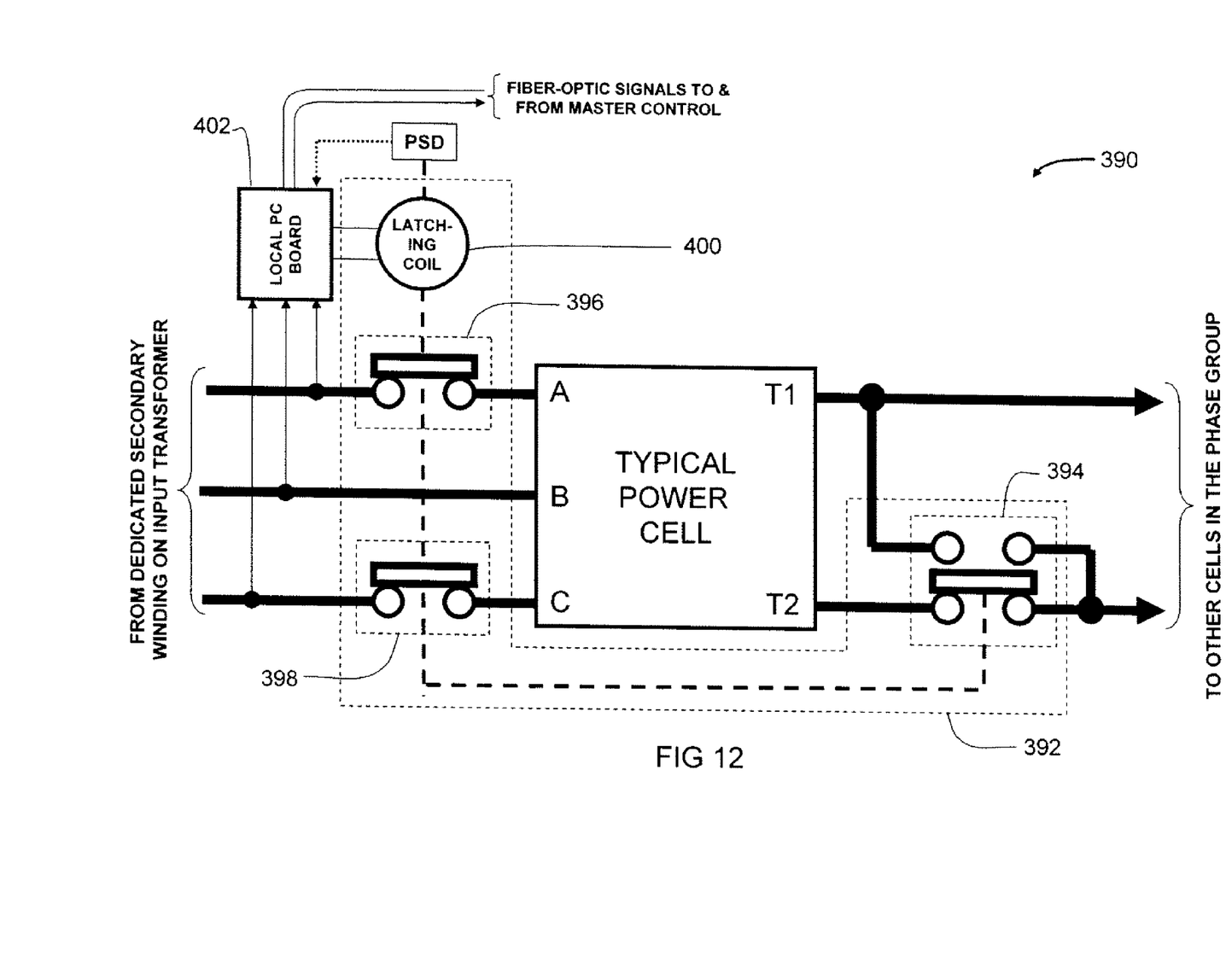
FIG. 12 illustrates various embodiments of a system for bypassing a power cell of a power supply.

FIG. 12 illustrates various embodiments of a system 390 for bypassing a power cell (e.g., power cell 210) of a power supply. The system 390 is similar to the system 370 of FIG. 11. The system 390 includes a bypass device 392 which may be embodied as a multi-pole contactor. The bypass device 392 may be identical to or similar to the bypass device 300 shown in FIGS. 7-9. The bypass device 392 includes a first contact 394 connected to the output terminals T1 and T2 of the power cell, a second contact 396 connected to the input terminal A of the power cell, and a third contact 398 connected to the input terminal C of the power supply. Each of the contacts 394, 396, 398 include stationary portions and a movable portion.

Although the second and third contacts 396, 398 are shown in FIG. 12 as being connected to input terminals A and C, it will be appreciated that, according to other embodiments, the second and third contacts 396, 398 may be connected to any two of the input terminals A, B and C.

In contrast to system 370 of FIG. 11, the system 390 includes a coil(s) 400 which controls the movable portions of the first, second and third contacts 394, 396, 398. According to various embodiments, the coil(s) 400 is embodied as a contactor coil. According to other embodiments, the coil(s) 400 is embodied as part of a magnetic latching contactor which does not need to have continuous power applied to the coil(s) in order to hold the plunger in its first or second position and/or to hold the moving portions of the contacts 394, 396, 398 in the non-bypass or bypass position. As previously discussed, the magnetic latching contactors may employ a single-coil or a two-coil configuration.

The system 390 also includes a single local printed circuit board 402 which is in communication with the coil(s) 400. The local printed circuit board 402 is configured to control the respective movable portions of the contacts 394, 396, 398 via the coil(s) 400. In general, the local printed circuit board 402 is configured to receive commands from, and report status to, a master control device (e.g., master control system 195 of FIG. 1) that is held near ground potential.

The local printed circuit board 402 is also configured to deliver pulses of energy to the coil(s) 400 as needed to change the position of the movable portions of the respective contacts 394, 396, 398, and to recognize the position of the movable portions of the respective contacts 394, 396, 398. The local printed circuit board 402 may obtain control power from the input lines which are connected to input terminals A, B, C of the power cell. As shown in FIG. 12, a position sensing device 403 may be utilized to provide the local printed circuit board 402 with the respective positions of the movable portions of the contacts 394, 396, 398. According to various embodiments, the position sensing device may be embodied as a switching device, a Hall Effect sensor, an optical sensor, etc.

For embodiments where the coil 400 is part of a magnetic latching contactor, the local printed circuit board 402 may also include a DC capacitor which can store enough energy to switch the plunger and/or the movable portions of the contacts 394, 396, 398 between positions. The local printed circuit board 402 may also include a power supply which restores the stored energy after a switching event, using AC power from the input lines connected to the input terminals A, B, C of the power cell.

While several embodiments of the invention have been described herein by way of example, those skilled in the art will appreciate that various modifications, alterations, and adaptions to the described embodiments may be realized without departing from the spirit and scope of the invention defined by the appended claims.

What is claimed is:

1. A system, comprising:
   a multi-winding device having a primary winding and a plurality of three-phase secondary windings;
   a plurality of power cells, wherein each power cell is connected to a different three-phase secondary winding of the multi-winding device; and
   a bypass device connected to first and second input terminals of at least one of the power cells and to first and second output terminals of the at least one of the power cells.

2. The system of claim 1, wherein the bypass device comprises:
   a first contact having stationary portions and a movable portion, wherein the first contact is connected to the first and second output terminals;
   a second contact having stationary portions and a movable portion, wherein the first contact is connected to the first input terminal;
   a third contact having stationary portions and a movable portion, wherein the first contact is connected to the second input terminal; and
   a solenoid coupled to the movable portions of the first, second and third contacts.

3. The system of claim 2, wherein the solenoid is a magnetic latching contactor.

4. The system of claim 3, wherein the magnetic latching contactor has one coil.

5. The system of claim 3, wherein the magnetic latching contactor has at least two coils.

6. The system of claim 2, further comprising a control circuit connected to the bypass device.

7. The system of claim 6, further comprising a position sensing device connected to the bypass device and the control circuit.

8. The system of claim 6, wherein the control circuit comprises a printed circuit board.

9. The system of claim 8, wherein the control circuit is configured to control the bypass device.

10. The system of claim 9, wherein the control circuit is connected to a master control device.

11. The system of claim 1, wherein the bypass device includes at least one electrically-driven contactor.

12. The system of claim 11, wherein the electrically driven contactor is at least one of a single pole single throw contactor, a single pole double throw contactor, or a multi-pole contactor.

13. A method, comprising:
   determining that a failure has occurred in a power cell of a multi-cell power supply; and
   applying a pulse of current from a control circuit to a solenoid which is coupled to the following:
      a first contact which is connected to a first input terminal of the power cell;
      a second contact which is connected to a second input terminal of the power cell; and
      a third contact which is connected to first and second output terminals of the power cell.

14. The method of claim 13, wherein determining if the failure has occurred comprises comparing an output voltage of the power cell to a commanded output voltage.

15. The method of claim 13, wherein applying the pulse to the solenoid comprises at least one of the following:
   applying the pulse with a positive polarity; and
   applying the pulse with a negative polarity.

16. The method of claim 13, wherein applying the pulse to the solenoid comprises at least one of the following:
   applying the pulse to a first of two coils; and
   applying the pulse to a second of two coils.

17. The method of claim 13, further comprising:
   determining a position of a movable portion of the first contact;
   determining a position of a movable portion of the second contact; and
   determining a position of a movable portion of the third contact.

18. The method of claim 13, further comprising changing the position of the movable portion of the first contact, the movable portion of the second contact, and the movable portion of the third contact in response to the pulse of current applied to at least one coil of the solenoid.

* * * * *